United States Patent
Caporal et al.

(10) Patent No.: US 10,354,082 B2
(45) Date of Patent: Jul. 16, 2019

(54) DOCUMENT STATE INTERFACE

(71) Applicant: AirWatch LLC, Atlanta, GA (US)

(72) Inventors: Colleen Caporal, Atlanta, GA (US); Muhammad Abeer, Roswell, GA (US)

(73) Assignee: AirWatch LLC, Atlanta, GA (US)

(*) Notice: Subject to any disclaimer, the term of this patent is extended or adjusted under 35 U.S.C. 154(b) by 0 days.

(21) Appl. No.: 14/739,204

(22) Filed: Jun. 15, 2015

(65) Prior Publication Data

US 2016/0364575 A1 Dec. 15, 2016

Related U.S. Application Data

(60) Provisional application No. 62/046,938, filed on Sep. 6, 2014.

(51) Int. Cl.
*G06F 21/62* (2013.01)
*H04L 29/08* (2006.01)
*G06F 16/14* (2019.01)

(52) U.S. Cl.
CPC ........ *G06F 21/6218* (2013.01); *G06F 16/148* (2019.01); *G06F 16/156* (2019.01); *H04L 67/06* (2013.01)

(58) Field of Classification Search
CPC ........ G06F 21/60; G06F 21/565; G06F 21/36; H04L 63/10
USPC .......... 713/171; 707/695; 715/772, 273, 266
See application file for complete search history.

(56) References Cited

U.S. PATENT DOCUMENTS

| | | | |
|---|---|---|---|
| 5,929,854 A | 7/1999 | Ross | |
| 6,745,245 B1 | 6/2004 | Carpenter | |
| 7,219,140 B2* | 5/2007 | Marl | H04L 29/08846 709/219 |
| 7,913,296 B2 | 3/2011 | Shigeeda | |
| 8,220,050 B2* | 7/2012 | Sarathy | G06F 21/567 709/224 |
| 8,239,880 B1 | 8/2012 | Caccavale | |
| 8,566,711 B1* | 10/2013 | Srivastava | G06F 17/2288 715/243 |
| 8,886,162 B2* | 11/2014 | Raleigh | G06Q 10/06375 455/405 |
| 9,055,387 B1* | 6/2015 | Boyle | H04L 67/32 |
| 9,240,962 B2 | 1/2016 | Jung | |
| 9,367,646 B2* | 6/2016 | Branton | G06F 17/30994 |
| 9,405,821 B1 | 8/2016 | Bessis | |
| 9,891,810 B2 | 2/2018 | Caporal | |
| 9,898,168 B2* | 2/2018 | Shapiro | G08B 25/14 |
| 10,069,932 B2* | 9/2018 | Votaw | H04L 67/306 |
| 2003/0097454 A1 | 5/2003 | Yamakawa et al. | |
| 2005/0154694 A1* | 7/2005 | Muller | G06F 17/30648 |

(Continued)

OTHER PUBLICATIONS

Office Action dated Apr. 21, 2017 for U.S. Appl. No. 14/740,683.

(Continued)

*Primary Examiner* — Michael R Vaughan
(74) *Attorney, Agent, or Firm* — Thomas Horstemeyer, LLP (57) ABSTRACT

Disclosed are various examples for an interface reflecting the states of files. A client application determines the states of files accessible through a file management system. An interface is generated with user interface elements corresponding to the files. The user interface elements are modified to reflect the states of the corresponding files.

20 Claims, 4 Drawing Sheets

(56) References Cited

U.S. PATENT DOCUMENTS

| | | | |
|---|---|---|---|
| 2006/0094445 A1* | 5/2006 | Park | H04W 12/08 455/456.2 |
| 2006/0095891 A1 | 5/2006 | Tofts et al. | |
| 2007/0203917 A1 | 8/2007 | Du et al. | |
| 2007/0209022 A1 | 9/2007 | Gourdol | |
| 2008/0188187 A1 | 8/2008 | Armstrong et al. | |
| 2011/0029565 A1* | 2/2011 | Estevez | G06Q 30/02 707/783 |
| 2011/0106846 A1* | 5/2011 | Matsumoto | G06F 17/30115 707/769 |
| 2012/0109915 A1* | 5/2012 | Kamekawa | G06F 17/30011 707/695 |
| 2012/0166314 A1 | 6/2012 | Kimberg | |
| 2013/0083069 A1 | 4/2013 | Yakishyn | |
| 2013/0198304 A1 | 8/2013 | Jung | |
| 2013/0201107 A1 | 8/2013 | Rossi | |
| 2013/0218845 A1* | 8/2013 | Kleppner | G06F 17/30165 707/687 |
| 2013/0239003 A1 | 9/2013 | Usenko | |
| 2013/0254699 A1* | 9/2013 | Bashir | G06F 3/0481 715/772 |
| 2013/0332916 A1* | 12/2013 | Chinn | G06F 8/65 717/169 |
| 2013/0339847 A1* | 12/2013 | Bartek | G06F 17/24 715/255 |
| 2014/0165176 A1 | 6/2014 | Ow | |
| 2014/0172793 A1 | 6/2014 | Stritzel et al. | |
| 2014/0193136 A1 | 7/2014 | Nishizawa | |
| 2014/0245015 A1* | 8/2014 | Velamoor | H04L 63/061 713/171 |
| 2014/0289225 A1 | 9/2014 | Chan | |
| 2014/0344739 A1 | 11/2014 | Yoon | |
| 2015/0081636 A1 | 3/2015 | Schindler et al. | |
| 2015/0178516 A1* | 6/2015 | Mityagin | G06F 21/6218 707/783 |
| 2015/0205464 A1* | 7/2015 | Kozlowski | G06F 3/0484 715/744 |
| 2016/0277382 A1 | 9/2016 | Streuter et al. | |
| 2017/0060887 A1* | 3/2017 | Murphy | G06F 16/125 |
| 2018/0011627 A1 | 1/2018 | Siracusano, Jr. | |
| 2018/0137139 A1 | 5/2018 | Bangalore et al. | |

OTHER PUBLICATIONS

Notice of Allowance dated Sep. 26, 2017 for U.S. Appl. No. 14/740,683.
Office Action dated Dec. 19, 2017 for U.S. Appl. No. 14/741,925.
Office Action dated Apr. 27, 2018 for U.S. Appl. No. 14/741,068.
Office Action dated May 3, 2018 for U.S. Appl. No. 15/893,966.
Office Action dated Apr. 23, 2018 for U.S. Appl. No. 14/741,925.
Office Action dated Dec. 5, 2018 for U.S. Appl. No. 14/741,068.
Office Action dated Dec. 14, 2018 for U.S. Appl. No. 15/893,966.

\* cited by examiner

DOCUMENT STATE INTERFACE

CROSS REFERENCE TO RELATED APPLICATIONS

This application claims priority to U.S. Provisional Application 62/046,938, titled "USER INTERFACE FUNCTIONALITY FOR PORTABLE DEVICES" and filed Sep. 6, 2014, which is hereby incorporated by reference in its entirety.

BACKGROUND

File management systems can allow a user to perform various operations with respect to remotely stored files. For example, a user can upload a file for storage, download stored files, or edit files. This allows for remote access to files independent of the client device assessing the file management system.

Some file management systems allow for multiple users to have access to files. This allows for additional features for the multiple users. For example, the file management system can implement access controls or permissions that dictate which users can access a particular file. Sharing controls can allow a user to extend access privileges to another user of the file management system. Files can also be edited by multiple users, allowing for collaborative document creation or editing.

The operations of the file management system can be facilitated by a user interface. The user interface can include user interface elements corresponding to files accessible to a user. Furthermore, as users act upon the stored files, the state of the file can change. For example, files can become accessible or inaccessible as permissions or network conditions change. Files can also exist in multiple versions as instances of the file are updated, pushed to the file management system, or downloaded to client devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

File management systems allow users of client devices to perform various operations with respect to remotely stored files. For example, the file management system can allow the upload or download of files between a client device and the file management system. The file management system can also allow a client device to read files or write changes to files. These read or written files can include remotely stored instances stored by the file management system or locally stored instances of files that can be uploaded or synced with the file management system. The file management system can also allow users to annotate or add comments to files. Additionally, the file management system can maintain user accounts defining permissions, requirements, or other attributes with respect to files.

As a client device operates on the files associated with the file management system, a state of the file can change. For example, if a client device reads a document file, the state of the document file can transition from an unread state to a read state. Additionally, if changes are made to a file by a first client device, other instances of the file on other client devices can indicate that an update to the file is available. As another example, if a client device downloads a file from the file management system, the state of the downloaded file can reflect that the client device can read or modify the file. This can potentially occur in the absence of a network connection to the file management system. As a further example, a remotely stored file is associated with a user account of the client device and has not been downloaded to the client device. The state of the remotely stored file can indicate that the file cannot be accessed, viewed, or operated upon in the absence of a network connection.

A client application can render a user interface that includes user interface elements corresponding to files that are accessible from the file management system. As the state of a file can change, the client application can modify or otherwise transform a visual attribute of the user interface element to provide an indication of the state of the corresponding file. Visual attributes that can be modified can include, for example, a coloration, an opacity, a focus, a clarity, or an iconography of a user interface element. For example, a read file, such as a file opened by a user of the client device, can have the coloration of its corresponding user interface element transformed to a grey scale, distinguishing the read file from unread files. As another example, in absence of a network connection to the file management system, a transparency or a blur effect can be applied to user interface elements corresponding to files not downloaded to the client device, and are therefore inaccessible. Other visual attribute modifications reflecting changes in file states will be discussed in further detail below.

In the following discussion, a general description of the system and its components is provided, followed by a discussion of the operation of the same.

Figure 1:
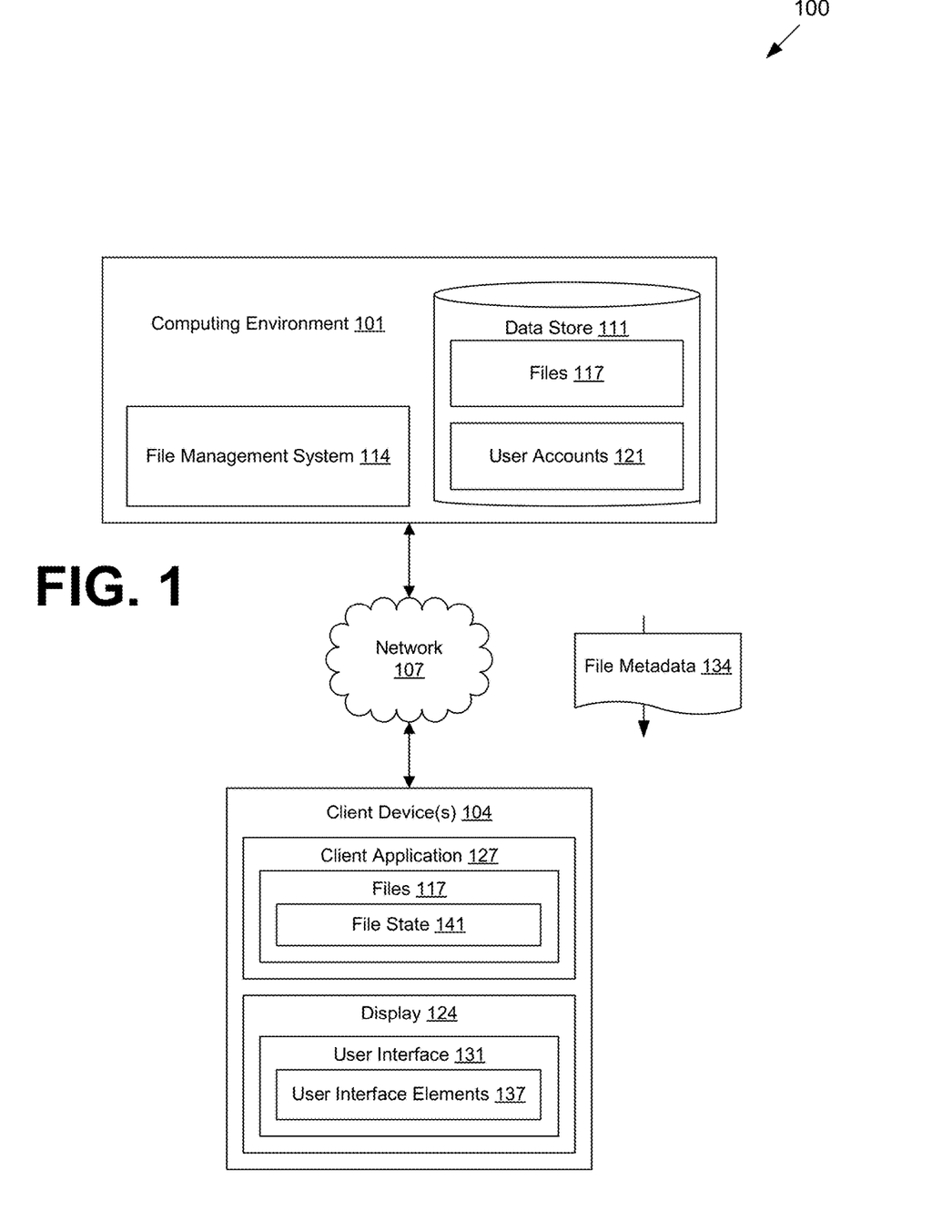
FIG. 1 is a drawing of a networked environment according to various examples.

With reference to FIG. 1, shown is a networked environment 100 according to various examples. The networked environment 100 includes a computing environment 101, and a client device 104, which are in data communication with each other over a network 107. The network 107 includes, for example, the Internet, intranets, extranets, wide area networks (WANs), local area networks (LANs), wired networks, wireless networks, or other suitable networks, or any combination of two or more such networks. For example, such networks can comprise satellite networks, cable networks, Ethernet networks, and other types of networks.

The computing environment 101 can include, for example, a server computer or any other system providing computing capabilities. Alternatively, the computing environment 101 can employ multiple computing devices that can be arranged, for example, in one or more server banks, computer banks, or other arrangements. The computing devices can be located in a single installation or can be distributed among many different geographical locations. For example, the computing environment 101 can include multiple computing devices that together form a hosted computing resource, a grid computing resource, or any other distributed computing arrangement. In some cases, the computing environment 101 can operate as at least a portion of an elastic computing resource where the allotted capacity of processing, network, storage, or other computing-related resources can vary over time. The computing environment 101 can also include or be operated as one or more virtualized computer instances. Generally, the computing environment 101 is operated in accordance with particular security protocols such that it is considered a trusted computing environment. The data store 111 can be representative of a single data store 111, or a plurality of data stores 111 in some examples.

The components executed on the computing environment 101, for example, include a file management system 114, and other applications, services, processes, systems, engines, or functionality not discussed in detail herein. The file management system 114 can facilitate the access and potentially the modification of files 117 by client devices 104. To this end, the file management system 114 can obtain files from client devices 104 through the network 107 or from other sources for storage in the data store 111. The file management system 114 can also communicate files 117 to client devices 104 through the network 107. The file management system 114 can also track versions, updates, or modifications of files 117. To this end, the file management system 114 can include version management or version control systems. The operations of the file management system 114 can be performed in accordance with permissions or requirements defined with respect to user accounts 121.

The data stored in the data store 111 includes, for example, files 117, user accounts 121, and potentially other data. Files 117 include instances of data accessed or modified by the file management system 114. To this end, files 117 can include documents, media, executable applications, or other data. Files 117 can also include folders or directories encoding portions of a file structure or file system implemented by the file management system 114.

User accounts 121 can define privileges or rights associated with the access or modification of files 117. For example, user accounts 121 can indicate files 117 or components of a file system to which a user account 121 can have permission to read, download, or otherwise access. User accounts 121 can also indicate files 117 or components of a file system to which a user account 121 can have permission to write, update, delete, or otherwise modify. User accounts 121 can also indicate files 117 that are required for download or update by a client device 104 accessing the file management system 114 through the user account 121. User accounts 121 can also define logic or access credentials, including usernames, passwords, encryption keys, temporary or permanent tokens, or other credentials.

The client device 104 is representative of a plurality of client devices that can be coupled to the network 107. The client device 104 can comprise, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client device 104 can include a display 124. The display 124 can comprise, for example, one or more devices such as liquid crystal display (LCD) displays, gas plasma-based flat panel displays, organic light emitting diode (OLED) displays, electrophoretic ink (E ink) displays, LCD projectors, or other types of display devices.

The client device 104 can be configured to execute various applications such as a client application 127 and/or other applications. The client application 127 can be executed in a client device 104, for example, to access network content served up by the computing environment 101 and/or other servers, thereby rendering a user interface 131 on the display 124. To this end, the client application 127 can comprise, for example, a browser, a dedicated application, and the user interface 131 can comprise a network page, an application screen. The client device 104 can be configured to execute applications beyond the client application 127 such as, for example, email applications, social networking applications, word processors, spreadsheets, and/or other applications.

Next, a general description of the operation of the various components of the networked environment 100 is provided. To begin, a client application 127 accesses the file management system 114 using a user account 121. This can include, for example, authenticating the client device 104 with the file management system 114 using authentication credentials or passing in a session identifier, cookie, token, or other identifier if the client device 104 has been previously authenticated. The client device 104 can then access file metadata 134 describing one or more files 117 associated with the user account 121 corresponding to the client device 104.

In some examples, the file metadata 134 can be obtained from the file management system 114, and describe one or more files 117 maintained by the file management system 114. In other examples, the file metadata 134 can be at least partially created by the client application 127, such as to describe files locally stored on the client device 104. For example, the file metadata 134 can indicate a selection or directory of files 117 last browsed using the user accounts 121, a selection of files 117 for a launch or home screen for accessing the file management system 114, a selection of 117 recently updated files 117, or another selection of files 117.

After receiving the file metadata 134, the client application 127 renders a user interface 131 including user interface elements 137 corresponding to the files 117 described in the file metadata 134. For example, the files 117 described in the file metadata 134 can have corresponding cards, icons, display areas, or other user interface elements 137. The user interface elements 137 can correspond to all of the files 117 described in the file metadata 134 or correspond to a portion of the files 117 described in the file metadata 134. For example, the user interface 131 can include user interface elements 137 corresponding to a portion of the files 117 described in the file metadata 134, and can further include navigation controls or accept gesture inputs to scroll, page, or otherwise navigate through user interface elements 137 corresponding to a remainder of the files 117 described in the file metadata 134.

Generating a user interface element 137 corresponding to a file 117 can include determining a file state 141 for a file 117. A file state 141 can reflect the state of a file 117 with respect to a client device 104 in which it is stored, which can be considered a device-side file state 141. As an example of a device-side file state 141, the file state 141 can indicate whether a file 117 corresponds to a locally stored draft requiring upload to the file management system 114. As another example of a device-side file state 141, the file state 141 can indicate whether a file 117 has been updated or modified since a last upload or sync of the file 117 to the file management system 114.

A file state 141 can also reflect the state of a file 117 with respect to the file 117 as stored in a file management system 114, which can be considered a server-side file state 141. For example, a server-side file state 141 can indicate whether a file 117 is featured, required for download, or otherwise distinguished. As another example, a file state 141 can indicate whether a file 117 can be accessed downloaded from the file management system 114 over the network 107. The ability to download a file 117 can be dependent on the presence of a network 107 connection, adequate permissions of a user account 121, or other factors. For example, a file state 141 may indicate that a file 117 can only be accessed over a network 107, but may not be downloaded. A file state 141 may also indicate that a file 117 can only be downloaded over a predefined type of network 107 connection. For example, the file state 141 may indicate that a file 117 can be downloaded over a wired or WiFi connection, but not over a cellular connection. Some file states 141 can also be defined with respect to the file 117 as stored in the client device 104, as stored in the client management system 114, or both, thereby being a combination of device-side and server-side file states 141. For example, a file state 141 can indicate whether a corresponding file 117 has been read using the client device 104 or another client device 104 accessing the file 117 via the file management system 114. The file state 141 can also indicate whether a file 117 has been favorited, commented on, shared, or been the subject of other actions of users of the file management system 114.

In some examples, determining the file state 141 for a given file 117 can include accessing metadata 134 corresponding to the given file 117 to determine if a flag or value is encoded in the metadata 134. This can include accessing metadata stored in the client device 104. This can also include requesting the metadata 134 from the file management system 141 and downloading the metadata 134 via the network 107. In other embodiments, the client application 127 can dynamically determine the file state 117.

After determining the file states 141, the client application 127 then modifies the user interface elements 137 corresponding to the files 117 according to the respective file state 141. This can include modifying one or more visual attributes of a standard or template user interface element 137 according to the file state 141. Modifying the visual attribute of a user interface element 137 can include modifying a coloration or color scale of the user interface element 137. For example, the client application 127 can modify the user interface element 137 for a read file 117 to a grey scale or other coloration. Modifying the visual attribute of a user interface element 137 can also include adding, removing, or modifying the iconography of a user interface element 137. For example, the client application 127 can modify a user interface element 137 for a file 117 with differing instances stored in the client device 104 and computing environment 101 to include an icon or other visual indicator. This can occur, for example, when an instance of a file 117 stored on a client device 104 has been modified since a last download or sync of the file 117. This can also occur, for example, when a file 117 accessible to the file management system 114 has been updated by another user since a last download of the file 117 or sync of file metadata 134.

Modifying the visual attributes of a user interface element 137 can also include modifying a transparency, opacity, or clarity of the user interface element 137. For example, a file 117 can be described in file metadata 134, but an instance of the file 117 is not stored in the client device 104. In the presence of a network 107 connection to the file management system 114, the user interface element 137 can remain unmodified since the corresponding file 117 can still be accessed. However, in the absence of a network 107 connection, the file 117 can be inaccessible by the client device 104 since there are no locally stored instances. In this example, the client application 127 can increase the transparency of the corresponding user interface element 137, or adjust the clarity of the corresponding user interface element 137, such as by applying a blur effect or filter.

As the client device 104 interacts with the files 117 stored in the client device 104 and stored by the file management system 114, the respective file states 141 can change. For example, an unread file 117 can be read, or a file 117 can become inaccessible due to loss of a network 107 connection. As the file states 141 change, the client application 127 can refresh the user interface 131 to render user interface elements 137 reflecting the current file state 141 of the respective files 117.

Figure 2:
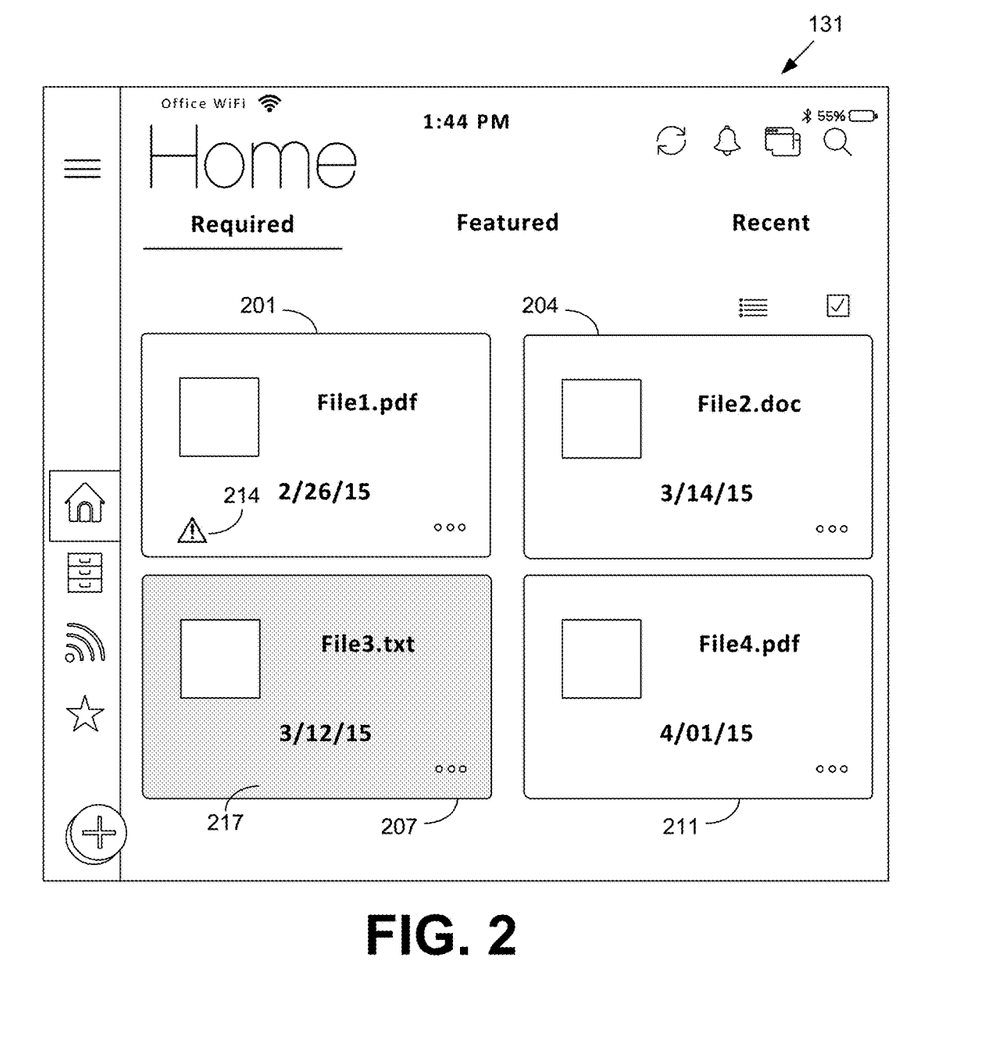
FIGS. 2 and 3 are pictorial diagrams of example user interfaces rendered by a client in the networked environment of FIG. 1 according to various examples.

Turning now to FIG. 2, shown is a pictorial diagram of an example user interface 131 encoded by a client application 127 for rendering on a display 124 of a client device 104. Items 201, 204, 207 and 211 represent user interface elements 137 corresponding to files 117 associated with a user account 121 of the file management system 114. In this example, the user interface element 137 of item 201 includes an additional icon 214 reflecting the file state 141 of the file 117 "File1.pdf." In this example, the icon 214 indicates that an updated version of "File1.pdf" is available from the file management system 114. Also in this example, the user interface element 137 of item 207 includes a modified background 217 reflecting the file state 141 of the file 117 "File3.txt." In this example, the client application 127 has modified the background 217 to be rendered in a grey scale coloration, indicating that "File3.txt" has been read using the user account 121 of the client device 104.

Figure 3:
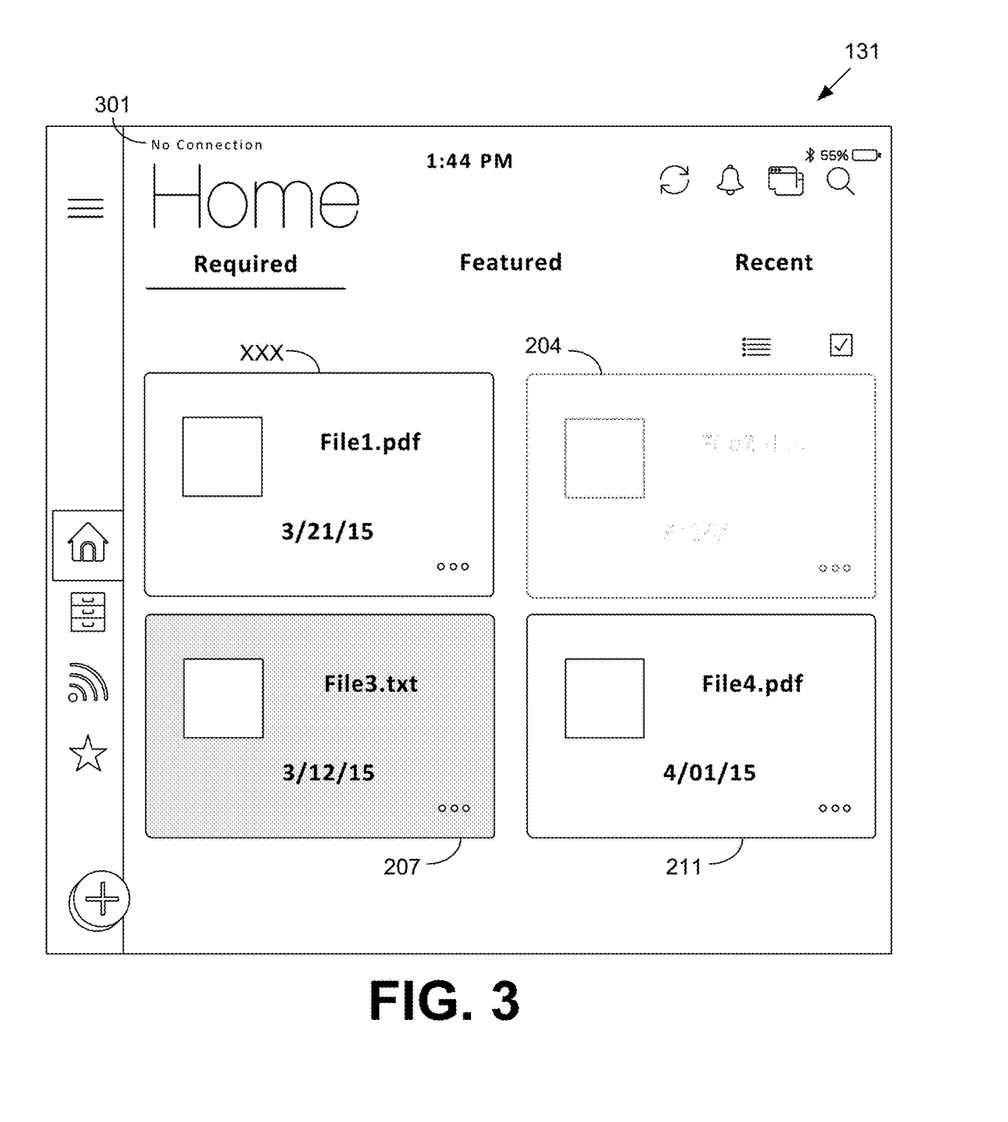

Moving on to FIG. 3, shown is a pictorial diagram of an example user interface 131 encoded by a client application 127 for rendering on a display 124 of a client device 104. In this example, as shown by item 301, the client device 104 rendering the user interface 131 lacks a network 107 connection. Items 201, 204, 207 and 211 represent user interface elements 137 corresponding to files 117 associated with a user account 121 of the file management system 114, as were described above with respect to FIG. 2. In this example, the user interface element 137 of item 201 lacks icon 214 of FIG. 2, indicating that the version of "File1.pdf" accessible by the client device 104 is the current version. Continuing with this example, as the client device 104 rendering the user interface 131 lacks a network 107, as indicated by item 301, the client device 104 can no longer access the file 117 "File2.doc." Accordingly, the client application 127 as reduced the transparency of the user interface element 137 indicated by item 204.

Figure 4:
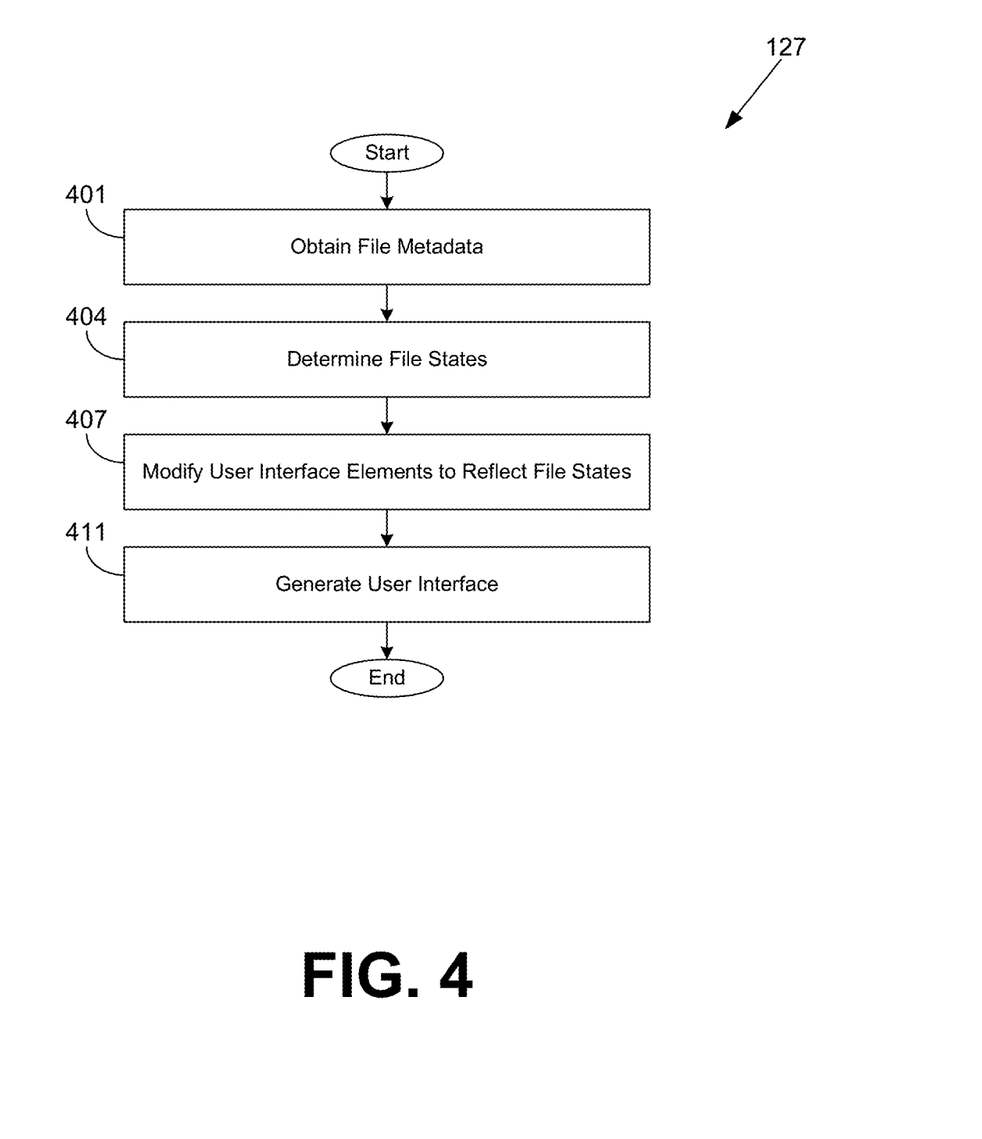
FIG. 4 is a flowchart illustrating one example of functionality implemented as portions of a client application executed in a client device in the networked environment of FIG. 1 according to various examples of the present disclosure.

Referring next to FIG. 4, shown is a flowchart that provides one example of the operation of a portion of the client application 127. As an alternative, the flowchart of FIG. 4 can be viewed as depicting an example of elements of a method implemented in the computing environment 101.

Beginning with step 401, the client application 127 obtains file metadata 134 describing one or more files 117 associated with a user account 121 of the file management system 114. In some examples, the file metadata 134 can be obtained from the file management system 114, and describe one or more files 117 maintained by the file management system 114. In other examples, the file metadata 134 can be at least partially created by the client application 127, such as to describe files locally stored on the client device 104. The file metadata 134 can also include a combination of data obtained from the file management system 114 and data generated by the client application 127 or otherwise stored on the client device 104.

Next, in step 404, the client application 127 determines file states 141 files 117 indicated in the file metadata 134. This can include comparing portions of file metadata 134 obtained from the file management system 114 with portions of file metadata 134 stored in the client device 104. For example, the client application 127 can compare version identifiers in the file metadata 134 to determine if a different or updated version of a file 117 is accessible from the file management system 114. Determining the file states 141 can also include determining if a network 107 connection is available and, if a network 107 connection is absent, whether an instance of a file 117 is stored in the client device 104. Determining the file state 141 can also include comparing a created date or a last modified date for a file 117 with a time that the client application 127 last downloaded the file 117 or otherwise synced with the file management system 114. If a file 117 was created or modified after a last sync or download time with respect to the client device 104 and the file management system 114, it can indicate that the file management system 114 does not have the file 117 or does not have an updated version of the file 117.

After determining the file states 141, in step 407, the client application 127 then modifies the user interface elements 137 corresponding to the files 117 to reflect the file states 141. This can include modifying one or more visual attributes of a standard or template user interface element 137 according to the file state 141. Modifying the visual attribute of a user interface element 137 can include modifying a coloration or color scale of the user interface element 137, adding, removing, or modifying the iconography of a user interface element 137 or modifying a transparency, opacity, or clarity of the user interface element 137.

Once the user interface elements 137 have been modified, the client application 127 encodes the user interface 131 including the modified user interface elements 137 for rendering by a display 124 of the client device 104, after which the process ends.

Although the client application 127, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

The flowchart of FIG. 4 shows the functionality and operation of an implementation of portions of the client application 127. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as a processor PROCESSOR_NUMBER in a computer system or other system. The machine code can be converted from the source code. If embodied in hardware, each block can represent a circuit or a number of interconnected circuits to implement the specified logical function(s).

Although the flowchart of FIG. 4 shows a specific order of execution, it is understood that the order of execution can differ from that which is depicted. For example, the order of execution of two or more blocks can be scrambled relative to the order shown. Also, two or more blocks shown in succession in FIG. 4 can be executed concurrently or with partial concurrence. Further, in some examples, one or more of the blocks shown in FIG. 4 can be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present disclosure.

Also, any logic or application described herein, including the client application 127, that comprises software or code can be embodied in any non-transitory computer-readable medium for use by or in connection with an instruction execution system such as, for example, a processor in a computer system or other system. In this sense, the logic can comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein, including the client application 127, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, can be either X, Y, or Z, or any combination Therefore, the following is claimed:

1. A non-transitory computer-readable medium embodying a program executable in at least one computing device, the program, when executed by the at least one computing device, being configured to cause the at least one computing device to at least:
   identify a file of a file management system that a user of a client device is authorized to access;
   encode a user interface comprising at least one user interface element corresponding to the file;
   identify a first file state associated with the file, wherein the first file state indicates that the file can be downloaded to the client device using a local area network connection;
   encode at least one visual attribute of the at least one user interface element based on the first file state;
   detect a change from the local area network connection to a cellular connection being used by the client device to access the file management system;
   identify a second file state associated with the file based on the cellular connection, wherein the second file state indicates that the file cannot be downloaded using the cellular connection; and
   adjust the at least one visual attribute in response to the identification of the second file state, the at least one visual attribute indicating that the file cannot be downloaded to the client device using the cellular connection.

2. The non-transitory computer-readable medium of claim 1, wherein identifying the first file state comprises:
   transmitting, to the file management system, a request to receive at least one server-side file state associated with the file; and
   receiving, from the file management system, the at least one server-side file state associated with the file.

3. The non-transitory computer-readable medium of claim 2, wherein the first file state comprises at least one of: an indication of a favorited file or an indication of the file as being required for download when accessing the file management system.

4. The non-transitory computer-readable medium of claim 1, wherein identifying the first file state comprises:
   querying a data store of the client device to identify at least one device-side file state associated with the file.

5. The non-transitory computer-readable medium of claim 4, wherein the at least one device-side file state comprises at least one of a draft state or an updates state, the draft state indicating a locally stored draft of the file requiring upload to the file management system, the updates state indicating the file has been modified since a last synchronization with the file management system.

6. The non-transitory computer-readable medium of claim 1, wherein identifying the first file state comprises determining whether the file is accessible based on a storage of the file in the client device.

7. The non-transitory computer-readable medium of claim 1, wherein the at least one visual attribute comprises at least one of: an iconography of the at least one user interface element, an opacity of the at least one user interface element, a clarity of the at least one user interface element, or a coloration of the at least one user interface element.

8. The non-transitory computer-readable medium of claim 1, wherein the first file state comprises a read state that indicates whether the file has been read using the client device.

9. A system, comprising:
   a processor; and
   a plurality of instructions in memory that, when executed by the processor, cause the processor to at least:
      identify a file of a file management system that a client device is authorized to access;
      encode a user interface comprising at least one user interface element corresponding to the file;
      identify a first file state associated with the file, wherein the first file state indicates that the file can be downloaded to the client device using a local area network connection;
      encode at least one visual attribute of the at least one user interface element based on the first file state;
      detect a change from the local area network connection to a cellular connection being used by the client device to access the file management system;
      identify a second file state associated with the file based on the cellular connection, wherein the second file state indicates that the file cannot be downloaded using the cellular connection; and
      adjust the at least one visual attribute in response to the identification of the second file state, the at least one visual attribute indicating that the file cannot be downloaded to the client device using the cellular connection.

10. The system of claim 9, wherein identifying the first file state comprises:
    transmitting, to the file management system, a request to receive at least one server-side file state associated with the file; and
    receiving, from the file management system, the at least one server-side file state associated with the file.

11. The system of claim 10, wherein the at least one server-side file state comprises a favorited file.

12. The system of claim 9, wherein identifying the first file state comprises:
    querying a data store of the client device to identify at least one device-side file state associated with the file.

13. The system of claim 12, wherein the at least one device-side file state comprises at least one of a draft state or an updates state.

14. The system of claim 9, wherein identifying the first file state comprises determining whether the file is accessible based on a storage of the file in the client device.

15. The system of claim 9, wherein the at least one visual attribute comprises at least one of: an iconography of the at least one user interface element, an opacity of the at least one user interface element, a clarity of the at least one user interface element, or a coloration of the at least one user interface element.

16. A method, comprising:
identifying a file of a file management system that a user of a client device is authorized to access;
encoding a user interface comprising at least one user interface element corresponding to the file;
identifying a first file state associated with the file, wherein the first file state indicates that the file can be downloaded to the client device using a local area network connection;
encoding at least one visual attribute of the at least one user interface element based on the first file state;
detecting a change from the local area network connection to a cellular connection being used by the client device to access the file management system;
identify a second file state associated with the file based on the cellular connection, wherein the second file state indicates that the file cannot be downloaded using the cellular connection; and
adjusting the at least one visual attribute in response to the identification of the second file state, the at least one visual attribute indicating that the file cannot be downloaded to the client device using the cellular connection.

17. The method of claim 16, wherein identifying the first file state comprises:
transmitting a request, to the file management system, to receive at least one server-side file state associated with the file; and
receiving, from the file management system, the at least one server-side file state associated with the file.

18. The method of claim 17, wherein the at least one server-side file state comprises at least one of: an indication of the file as a favorited file, an indication of the file as being required for download, or an indication that an update is available for the file.

19. The method of claim 16, wherein the method further comprises comparing a first version identifier associated with a server-side version of the file and a second version identifier associated with a client-side version of the file.

20. The method of claim 16, wherein the second file state indicates both that metadata of the file is accessible to client device using the cellular connection and that the file cannot be downloaded using the cellular connection.

* * * * *